(12) United States Patent
Kawahito et al.

(10) Patent No.: US 11,078,087 B2
(45) Date of Patent: Aug. 3, 2021

(54) PLATE-SHAPED HYDROTALCITE WITH HIGH ASPECT RATIO, METHOD FOR MANUFACTURING SAME AND RESIN COMPOSITION

(71) Applicant: KYOWA CHEMICAL INDUSTRY CO., LTD., Kagawa (JP)

(72) Inventors: Kenta Kawahito, Kagawa (JP); Shigeo Miyata, Kagawa (JP)

(73) Assignee: KYOWA CHEMICAL INDUSTRY CO., LTD., Kagawa (JP)

( * ) Notice: Subject to any disclaimer, the term of this patent is extended or adjusted under 35 U.S.C. 154(b) by 90 days.

(21) Appl. No.: 16/470,716

(22) PCT Filed: Dec. 19, 2017

(86) PCT No.: PCT/JP2017/045583
§ 371 (c)(1),
(2) Date: Jun. 18, 2019

(87) PCT Pub. No.: WO2018/117114
PCT Pub. Date: Jun. 28, 2018

(65) Prior Publication Data
US 2020/0087157 A1 Mar. 19, 2020

(30) Foreign Application Priority Data
Dec. 22, 2016 (JP) ............... JP2016-250094

(51) Int. Cl.
*C01F 7/00* (2006.01)
*C08K 3/22* (2006.01)

(52) U.S. Cl.
CPC .............. *C01F 7/007* (2013.01); *C01F 7/005* (2013.01); *C08K 3/22* (2013.01); *C01P 2004/03* (2013.01); *C01P 2004/24* (2013.01); *C01P 2004/54* (2013.01); *C01P 2006/12* (2013.01); *C08K 2003/2227* (2013.01); *C08K 2201/003* (2013.01); *C08K 2201/004* (2013.01); *C08K 2201/011* (2013.01)

(58) Field of Classification Search
CPC .................................................... C01F 7/005
See application file for complete search history.

(56) References Cited

U.S. PATENT DOCUMENTS

| 4,284,762 | A | 8/1981 | Miyata et al. |
| 6,403,007 | B1 | 6/2002 | Kido et al. |
| 6,413,639 | B1 * | 7/2002 | Kobayashi ............... C08K 9/04 427/220 |
| 2009/0108233 | A1 | 4/2009 | Lu et al. |

FOREIGN PATENT DOCUMENTS

| CN | 103318933 A | 9/2013 |
| EP | 1063199 A1 | 12/2000 |
| JP | S48-29477 B1 | 9/1973 |
| JP | S55-80447 A | 6/1980 |
| JP | 2000-086235 A | 3/2000 |
| JP | 2008-525292 A | 7/2008 |
| JP | 2011-197435 A | 10/2011 |
| JP | 2013-212937 A | 10/2013 |
| JP | 2014-129202 A | 7/2014 |
| JP | 2015-22289 A | 2/2015 |
| WO | 2006050648 A1 | 5/2006 |
| WO | 2006066341 A1 | 6/2006 |
| WO | WO-2008050927 A1 * | 5/2008 .............. C01F 7/005 |
| WO | 2017052336 A1 | 3/2017 |

OTHER PUBLICATIONS

International Search Report for PCT/JP2017/045583, dated Mar. 6, 2018 (5 pages).
Written Opinion of the International Searching Authority, dated Mar. 6, 2018 (3 pages).
Tao, Q. et al., Synthesis and characterization of layered double hydroxides with a high aspect ratio, Journal of Solid State Chemistry,179:708-715 (2006).
Liu, z. et al., Selective and Controlled Synthesis of a- and [b-Cobalt Hydroxides in Highly Developed Hexagonal Platelets, J. Am. Chem. Soc., 27:13869-13874 (2005).
A. Schutz and P. Biloen, J., Interlamellar chemistry of hydrotalcites: I Polymerization of silicate anions, Solid State Chemistry, 68:360-368 (1987).
W. T. Reichle, Synthesis of anionic clay minerals (mixed metal hydroxides, hydrotalcite), Solid State Ionics, 22:135-141 (1986).
M. Ogawa and H. Kaiho, Homogeneous Precipitation of Uniform Hydrotalacite Particles, Langmuir, 18:4240-4242 (2002).

* cited by examiner

*Primary Examiner* — Vickey Nerangis
(74) *Attorney, Agent, or Firm* — Fitch, Even, Tabin & Flannery, LLP

(57) ABSTRACT

With respect to a plate-shaped hydrotalcite in which the average width of primary particles is increased, (1) the aspect ratio of secondary particles is increased by suppressing aggregation of primary particles by relatively reducing the average thickness thereof, and 2) the formation of a by-product that impairs the transparency of a resin is suppressed. Provided is a plate-shaped hydrotalcite represented by a formula (1) below:

$$(M^{2+})_{1-x}(M^{3+})_x(OH)_2(A^{n-})_{x/n} \cdot mH_2O \quad (1)$$

where $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.1 \le x \le 0.33$ and $0 \le m \le 10$,
the formula (1) satisfying (A) to (D) below:
(A) the average width of primary particles as measured using an SEM method is 1 μm or greater; (B) the average thickness of primary particles as measured using an SEM method is 80 nm or less; (C) the degree of monodispersity of width is 50% or greater; and (D) the degree of monodispersity of thickness is 50% or greater.

17 Claims, 4 Drawing Sheets

[Fig. 1]
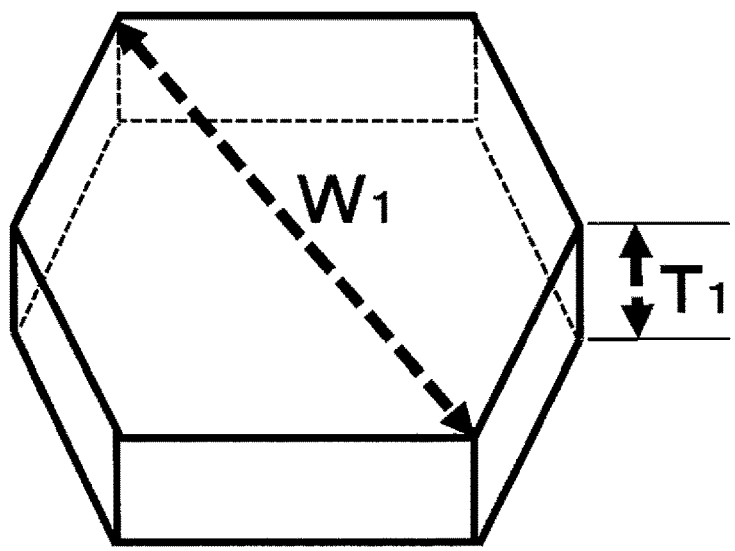
[Fig. 2]
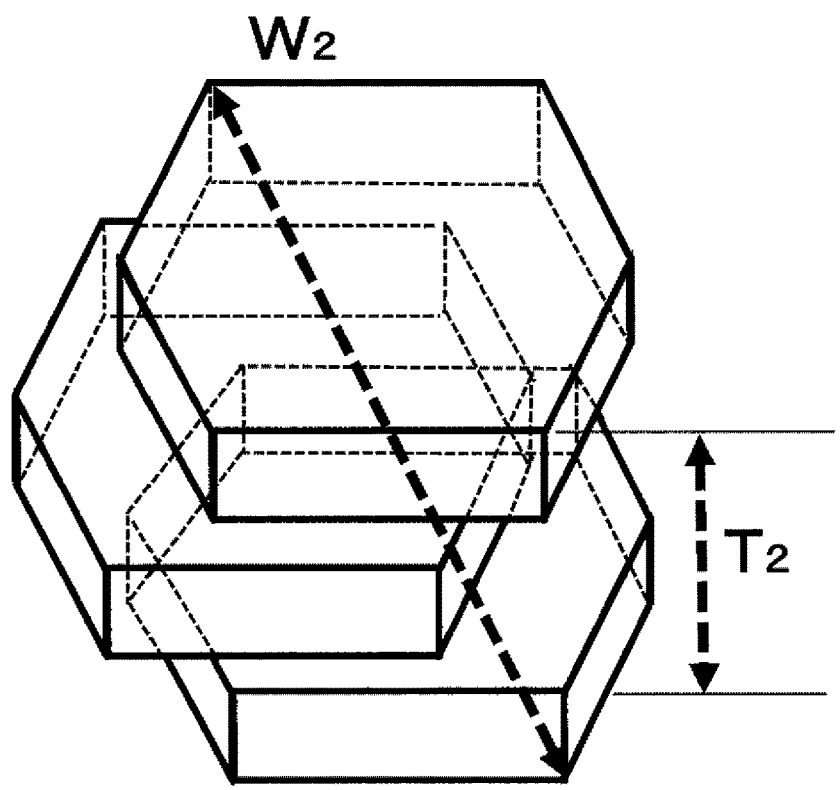

[Fig. 3]
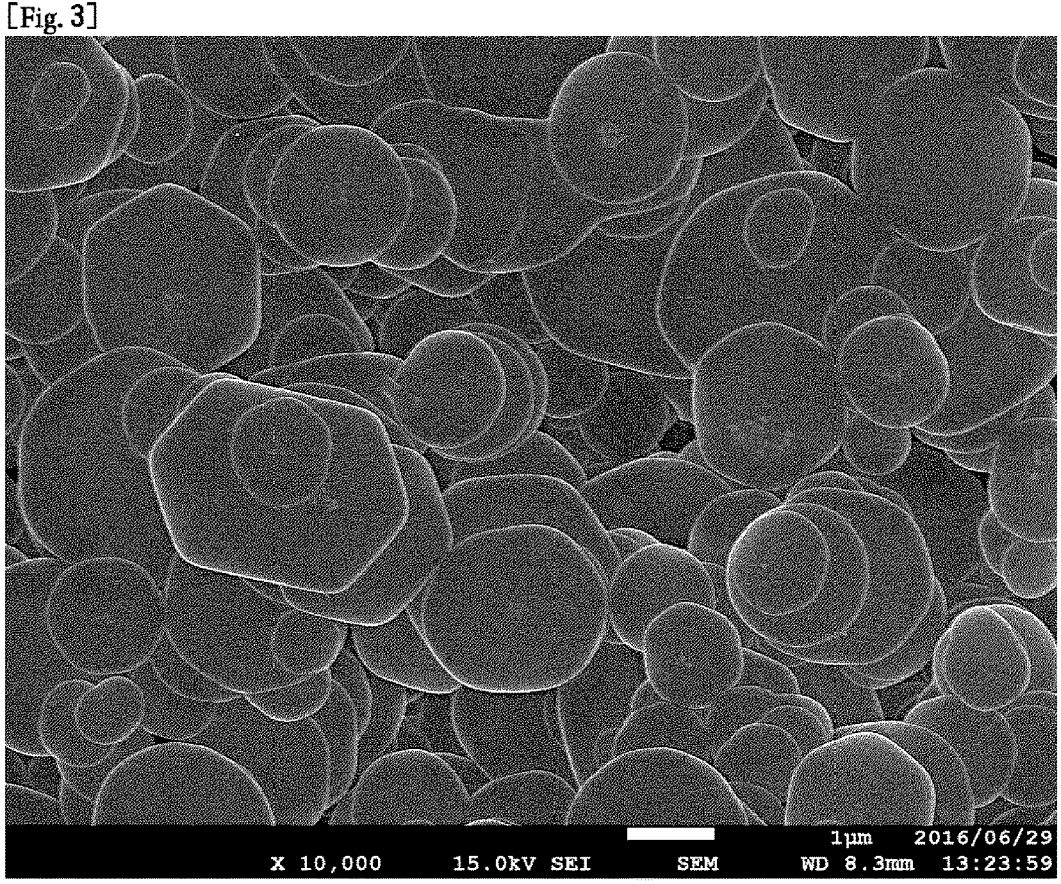
[Fig. 4]
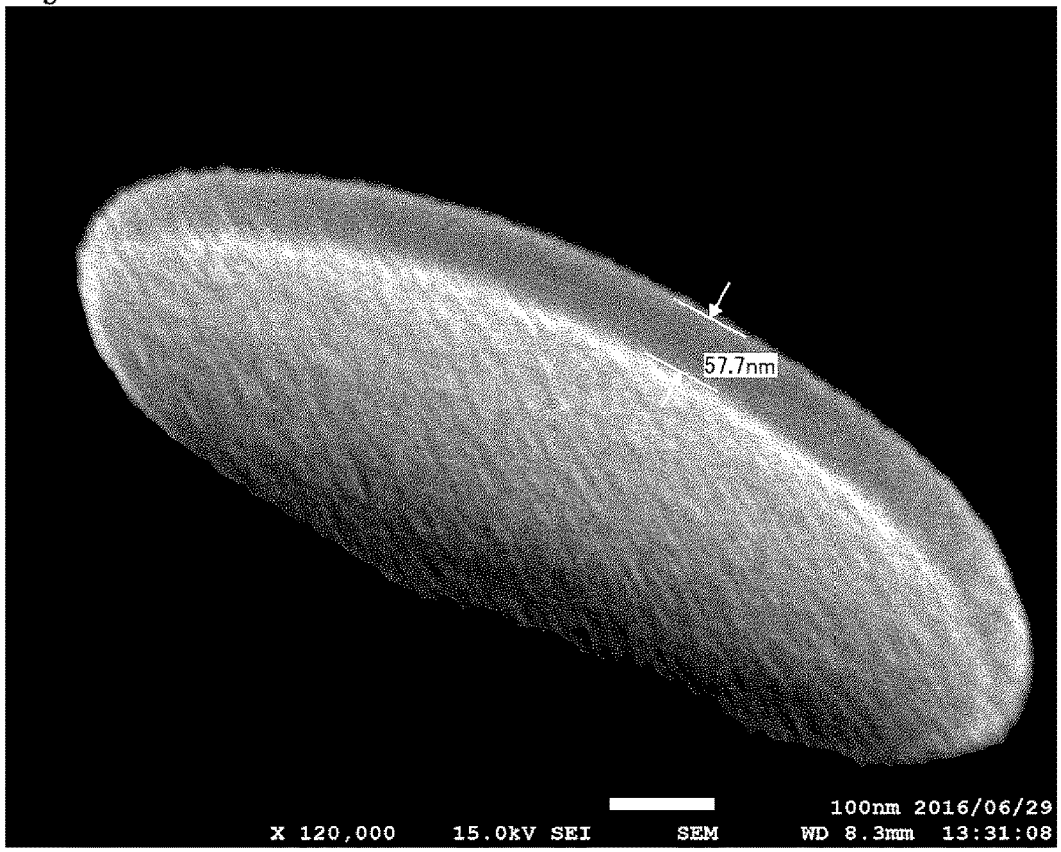

[Fig. 5]
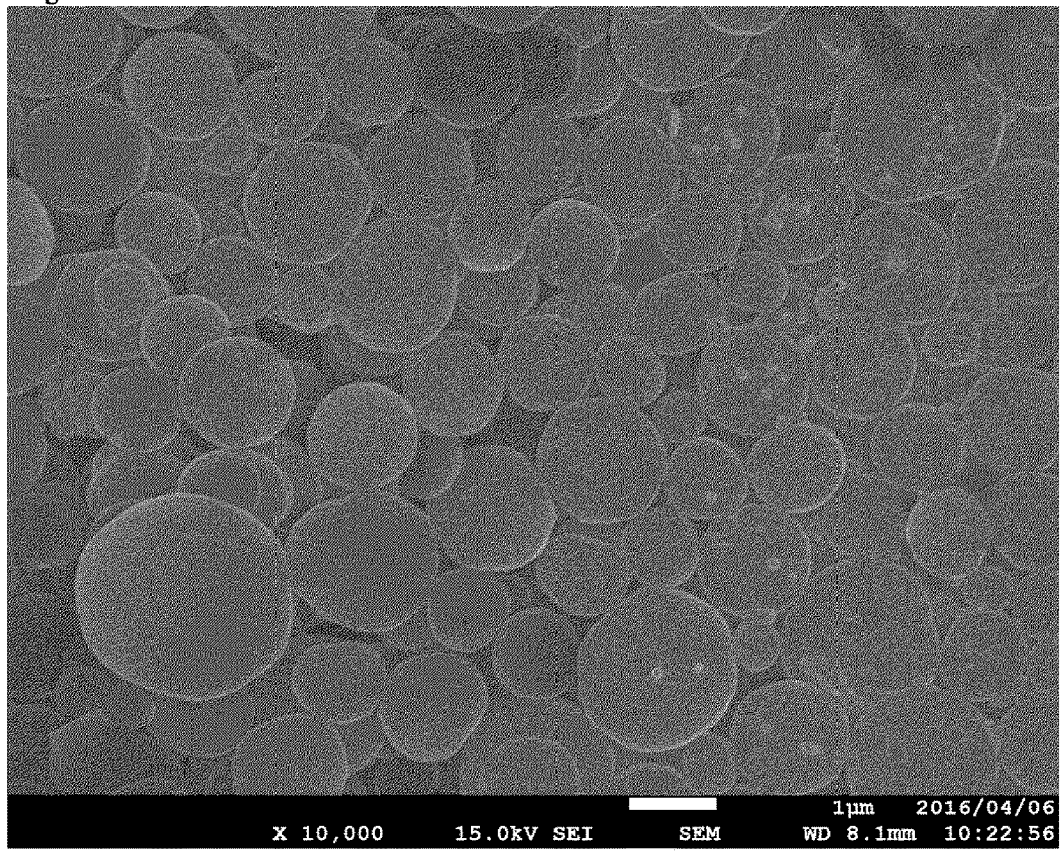
[Fig. 6]
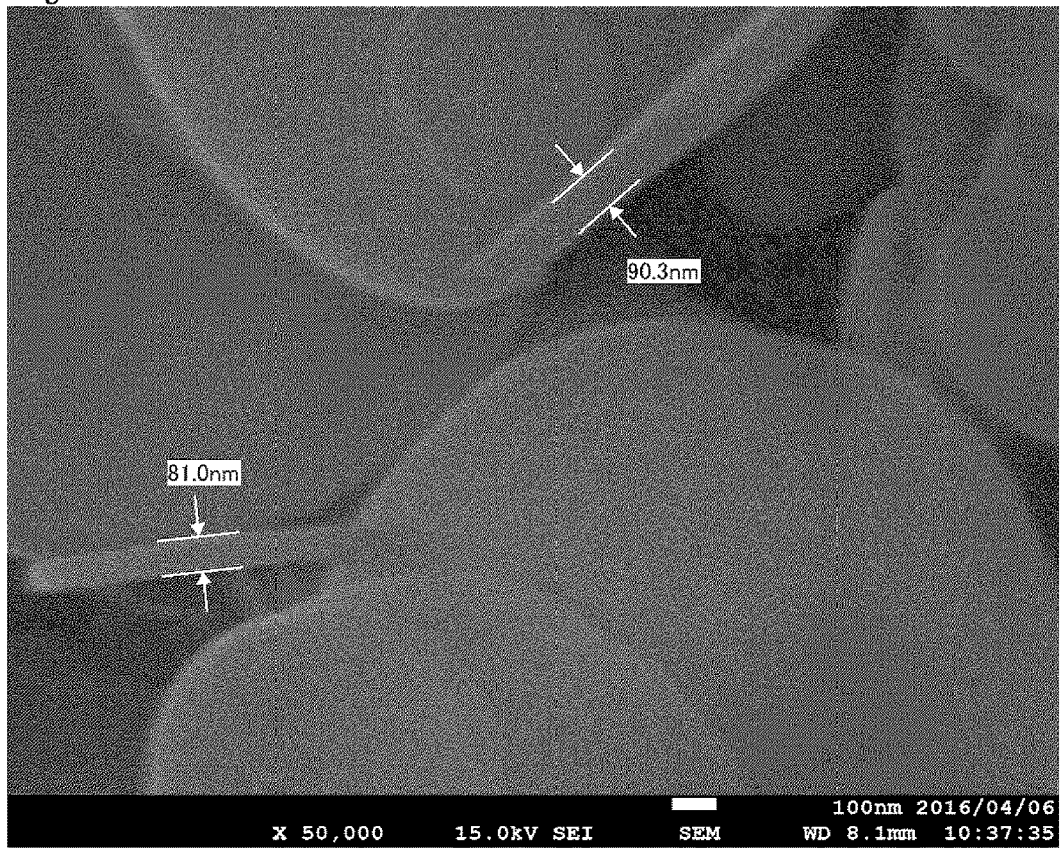

[Fig. 7]
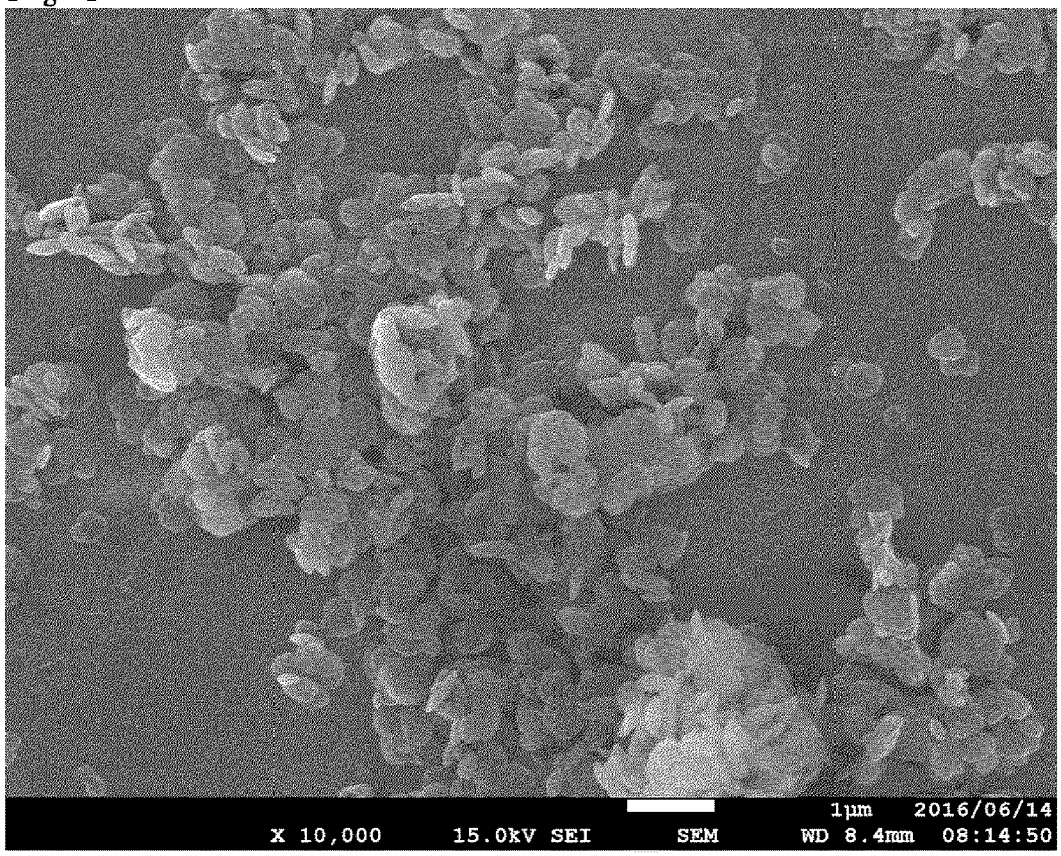
[Fig. 8]
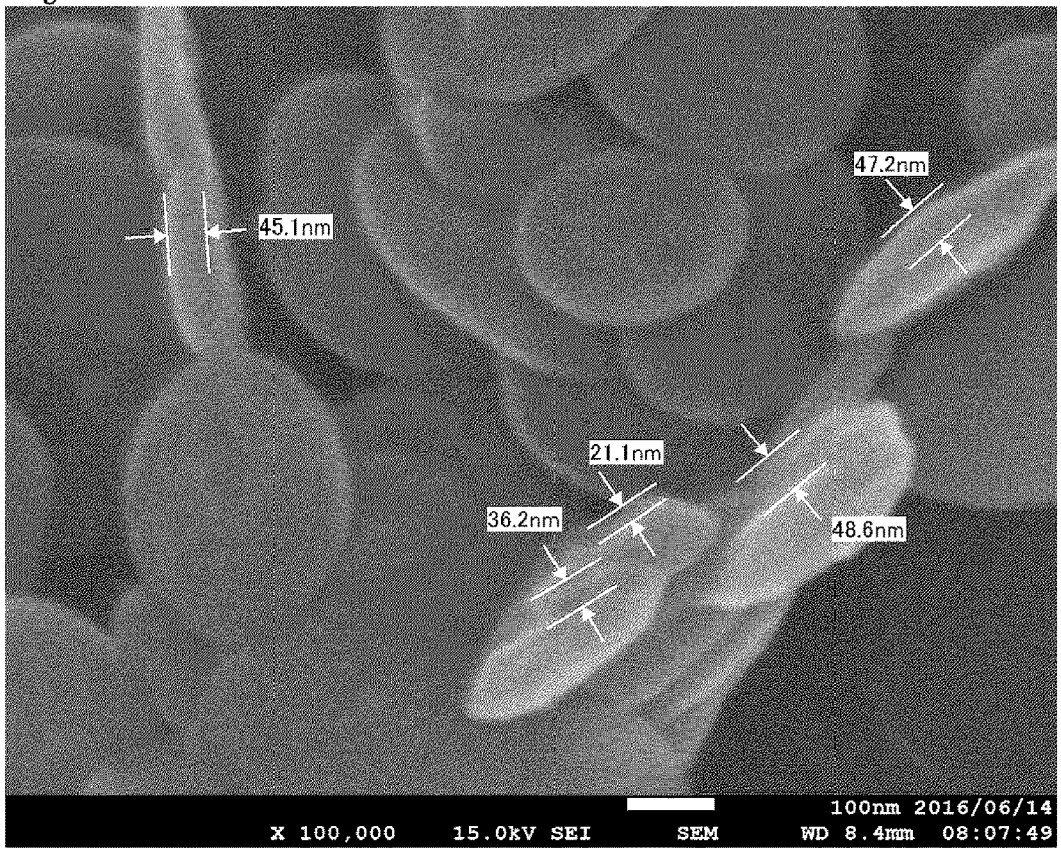

PLATE-SHAPED HYDROTALCITE WITH HIGH ASPECT RATIO, METHOD FOR MANUFACTURING SAME AND RESIN COMPOSITION

CROSS-REFERENCE TO RELATED APPLICATIONS

This application is a U.S. national phase application filed under 35 U.S.C. § 371 of International Application No. PCT/JP2017/045583, filed Dec. 19, 2017, designating the United States, which claims priority from Japanese Patent Application No. 2016-250094, filed Dec. 22, 2016, and the complete disclosures of all the applications are hereby incorporated herein by reference in their entirety.

TECHNICAL FIELD

The present invention relates to a plate-shaped hydrotalcite in which primary particles have a large average width and a small average thickness, the degree of monodispersity is high, and the aspect ratio is high, a method for manufacturing the same, and a resin composition of the same.

BACKGROUND ART

A plate-shaped hydrotalcite can be synthesized using a coprecipitation method. However, with regard to primary particles of a plate-shaped hydrotalcite that is synthesized using this method, only minute crystals with an average width of several tens of nanometers can be obtained. In addition, these primary particles strongly aggregate to form many secondary particles (several micrometers to several tens of micrometers). Therefore, improvements need to be made to be able use the plate-shaped hydrotalcite as a resin additive.

For this reason, the inventors of the present invention developed a method in which hydrothermal treatment at 150 to 180° C. is performed after a coprecipitation reaction. This method makes it possible to manufacture monodisperse particles in which primary particles have grown well and few primary particles are aggregated. The primary particles of this plate-shaped hydrotalcite have an average width of 0.4 to 0.5 µm and an average thickness of 0.1 to 0.2 µm, and the aspect ratio is 4 to 5. (Patent Document 1)

As a result, the dispersibility of the plate-shaped hydrotalcite in a resin was improved, and new uses of the plate-shaped hydrotalcite as a resin additive became possible. Examples of such uses include a thermal stabilizer for polyvinyl chloride, a decomposing and neutralizing agent for a residue of a polyolefin polymerization catalyst, a heat-insulating agent (infrared absorber) for an agricultural film, an acid acceptor for a halogen-containing rubber, and the like.

In keeping with this trend, various attempts have also been made to synthesize a plate-shaped hydrotalcite in which the average width of primary particles is further increased to 1 µm or greater. However, in all of the attempted methods, a by-product, boehmite that causes deterioration of the transparency of a resin when the plate-shaped hydrotalcite is added to the resin, is formed as an impurity, or the primary particles strongly aggregate, and therefore the plate-shaped hydrotalcite needs to be improved if it is to be used as a resin additive. For example, according to Non-Patent Document 1, although large primary particles having an average width of 1 to 2 µm and an average thickness of 0.1 µm are obtained by promoting the growth of primary particles by performing hydrothermal treatment at a high temperature of 220° C., boehmite is formed as a by-product, and the primary particles are aggregated. (Non-Patent Document 1)

Moreover, according to Non-Patent Document 2, although coarse crystals in which the average width of primary particles is 15 µm and the average thickness thereof is 0.1 µm are obtained by performing hydrothermal treatment at a higher temperature of 300° C., boehmite is formed as a by-product, and the primary particles are aggregated. (Non-Patent Document 2)

Hydrotalcites have a refractive index close to that of resins, and therefore, a highly transparent film can be obtained by adding a hydrotalcite to a resin. However, when an attempt is made to obtain primary particles having a large average width by increasing the treatment temperature during the hydrothermal treatment as in Non-Patent Documents 1 and 2, boehmite is formed as an impurity, and the transparency of the resulting film decreases due to the different refractive indices. To address this issue, there is demand for increasing the average width of primary particles while preventing impurities that cause a decrease in transparency, such as boehmite, from being contained.

On the other hand, Patent Document 2 discloses that, with respect to a hydrotalcite having a high aspect ratio, a plate-shaped hydrotalcite in which primary particles had an average width of 0.3 to 10 µm and the aspect ratio was 45 or greater was obtained by causing a reaction at 100 to 200° C. in a reaction system in which a carboxylic acid having 2 to 6 carbon atoms and a lower alcohol were also present.

However, since the average diameter ($D_{50}$) of secondary particles of the plate-shaped hydrotalcite that was manufactured using this method was 22 µm prior to pulverization (Example 5), and the average width of primary particles of the plate-shaped hydrotalcite prior to pulverization was 1 µm (Example 1, Table 1), it can be interpreted that the plate-shaped hydrotalcite (prior to pulverization) manufactured using this method was severely aggregated. It was not indicated that the degrees of monodispersity of the width and the thickness were 50% or greater. (Patent Document 2)

Also, Patent Document 3 proposes a method for manufacturing a plate-shaped hydrotalcite by adding a bicarbonate to an aqueous solution containing a divalent metal ion and a trivalent metal ion and causing a reaction. This patent document states that, with this method, a plate-shaped hydrotalcite in which primary particles had an average width of 0.9 to 10 µm and the aspect ratio (ratio between the major diameter and the thickness of particles when it is assumed that the particles have a hexagonal plate-shaped surface) was 40 or greater was obtained by adjusting the molar ratio between the divalent metal and the trivalent metal.

However, the reaction temperature was as low as 70 to 100° C., and the average plate surface diameter of the obtained plate-shaped hydrotalcite was 0.82 to 1.3 µm (Table 1) and did not reach 2 µm. Moreover, the thickness thereof is not clear. Accordingly, it was not indicated that the degrees of monodispersity of the width and the thickness were 50% or greater. (Patent Document 3)

Also, Patent Document 4 contains a description of a plate-shaped hydrotalcite with an aspect ratio of greater than 50, for use in a sealing agent for a liquid crystal dropping method, but makes no mention of how this plate-shaped hydrotalcite is manufactured. This patent document merely states that Perkalite A100 and Perkalite LD, which are trade names, from Perkalite are used (Table 1) and that these hydrotalcites have an aspect ratio of 200 to 300.

Note that Patent Document 4 also mentions the coefficient of variation (CV value) of the particle diameter of a plate-shaped hydrotalcite. According to this patent document, the CV value can be calculated using the formula, CV value of particle diameter (%)=(standard deviation of particle diameter/average particle diameter)×100, and it is desirable that the CV value is 50% or less. However, both the standard deviation of particle diameter and the average particle diameter, which are used to calculate the CV value, are with respect to primary particles, and their definitions are different from the definitions of the degrees of monodispersity of the width and the thickness as specified in the present application. (Patent Document 4)

In the case where a hydrotalcite is added as a resin additive for the purpose of improving the functions, such as stiffness and gas barrier properties, of a resin, it is the aspect ratio of secondary particles that is important. Even when the aspect ratio of primary particles is high, if the primary particles aggregate to form many secondary particles (if the degrees of monodispersity of the width and the thickness are low), the aspect ratio of all of the particles significantly decreases compared with the aspect ratio of the primary particles alone, and therefore, the hydrotalcite does not exhibit sufficient performance as a filler. Accordingly, "primary particles having a high aspect ratio" as well as "increased degrees of monodispersity of the width and the thickness" are to be achieved. No mention of such objects can be found in related art.

That is to say, there is demand for a method for manufacturing a plate-shaped hydrotalcite in which primary particles have a large average width and a small average thickness and consequently the aspect ratio is high, few primary particles are aggregated (the degrees of monodispersity of the width and the thickness are high), and no by-products that impair the transparency of a resin are formed.

CITATION LIST

Patent Documents

Patent Document 1: JP S55-80447A
Patent Document 2: JP 2013-212937A
Patent Document 3: JP 2014-129202A
Patent Document 4: JP 2015-22289A Non-Patent Documents Non-Patent Document 1: A. SCHUTZ and P. BILOEN, J. Solid State Chemistry, 68, 360, 1987
Non-Patent Document 2: W. T. REICHLE, Solid State Ionics, 22, 135, 1986
Non-Patent Document 3: M. Ogawa and H. Kaiho, Langmuir, 18, 4240, 2002

SUMMARY OF INVENTION

Technical Problem

An object of the present invention is to address the problems with related art that arise when the average width of primary particles is increased. That is to say, with respect to a plate-shaped hydrotalcite, (1) the aspect ratio of secondary particles is increased (to 10 or greater, for example) by relatively reducing the average thickness and suppressing aggregation of primary particles, and (2) the formation of a by-product that impairs the transparency of a resin is suppressed.

In other words, provided are a plate-shaped hydrotalcite in which the width of primary particles is as large as 1 μm or greater while the formation of boehmite as a by-product is suppressed, the thickness of primary particles is smaller than 80 nm, and the aspect ratio is high, wherein the aspect ratio of secondary particles is increased by increasing the degrees of monodispersity of the width and the thickness, as well as a method for manufacturing the plate-shaped hydrotalcite.

Another object of the present invention is to provide a resin composition in which a plate-shaped hydrotalcite in which secondary particles have an increased aspect ratio is added to a resin and the functions of the resin are thereby increased, as well as a molded product of the resin composition.

Solution to Problem

The present invention provides a plate-shaped hydrotalcite that has achieved the above-described object, the plate-shaped hydrotalcite being represented by a formula (1) below:

$$(M^{2+})_{1-x}(M^{3+})_x(OH)_2(A^{n-})_{x/n} \cdot mH_2O \quad (1)$$

where $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.1 \leq x \leq 0.33$ and $0 \leq m \leq 10$, the formula (1) satisfying (A) to (D) below:
(A) the average width of primary particles as measured using an SEM method is 1 μm or greater;
(B) the average thickness of primary particles as measured using an SEM method is 80 nm or less;
(C) the degree of monodispersity of width expressed by an equation below is 50% or greater:

degree of monodispersity of width (%)=(average width of primary particles as measured using the SEM method/average width of secondary particles as measured using a laser diffraction method)×100; and (D) the degree of monodispersity of thickness expressed by an equation below is 50% or greater:

degree of monodispersity of thickness (%)=(average thickness of primary particles as measured using the SEM method/average thickness of secondary particles as measured using an SEM method)×100.

The plate-shaped hydrotalcite with a high aspect ratio of the present invention can be obtained using the following method.

A plate-shaped hydrotalcite in which a monovalent anion is contained between layers, the plate-shaped hydrotalcite being obtained through a coprecipitation reaction and represented by a formula (2) below, is subjected to hydrothermal treatment at 200 to 300° C. for 10 to 24 hours. Note that, in light of the crystal growth, it is preferred that a monovalent carboxylic acid is also present, though this is optional.

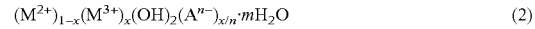

$$(M^{2+})_{1-x}(M^{3+})_x(OH)_2(A^{n-})_{x/n} \cdot mH_2O \quad (2)$$

where $M^{2+}$ indicates at least one divalent metal, $M^{3+}$ indicates at least one trivalent metal, $A^{n-}$ indicates a monovalent anion such as $F^-$, $Cl^-$, $Br^-$, $I^-$, $NO_3^-$, or $CH_3COO^-$, and x and m are within respective ranges of $0.1 \leq x \leq 0.33$ and $0 \leq m \leq 10$.

After the hydrothermal treatment, ion exchange with a di- or higher valent anion is performed, and thus, the plate-shaped hydrotalcite can be converted to the plate-shaped hydrotalcite of the present invention, which is represented by the formula (1) and in which the interlayer anion includes any type of anion including the di- or higher valent anion.

Advantageous Effects of Invention

The plate-shaped hydrotalcite of the present invention can impart stiffness, flame retardancy, glossiness, and gas barrier properties when added to a resin. In addition, the plate-shaped hydrotalcite can impart a rustproofing effect when added to a paint, and can also be used as a base of a pearl pigment.

BRIEF DESCRIPTION OF DRAWINGS

FIG. 1 is a schematic diagram for explaining the width and the thickness of a primary particle.
FIG. 2 is a schematic diagram for explaining the width and the thickness of a secondary particle.
FIG. 3 is an SEM micrograph at a magnification of 10,000 of a plate-shaped hydrotalcite of a sample 1 of Example 1
FIG. 4 is an SEM micrograph at a magnification of 120,000 of the plate-shaped hydrotalcite of the sample 1 of Example 1.
FIG. 5 is an SEM micrograph at a magnification of 10,000 of a plate-shaped hydrotalcite of a sample 9 of Comparative Example 2.
FIG. 6 is an SEM micrograph at a magnification of 50,000 of the plate-shaped hydrotalcite of the sample 9 of Comparative Example 2.
FIG. 7 is an SEM micrograph at a magnification of 10,000 of a plate-shaped hydrotalcite of a sample 10 of Comparative Example 3.
FIG. 8 is an SEM micrograph at a magnification of 100,000 of the plate-shaped hydrotalcite of the sample 10 of Comparative Example 3.

DESCRIPTION OF EMBODIMENTS

Hereinafter, the present invention will be described in detail.
<Plate-Shaped Hydrotalcite>
With respect to a plate-shaped hydrotalcite of the present invention, the types of the metals, the range of x (abundance ratio between the divalent metal and the trivalent metal), the range of m, the type of the interlayer anion, the average width of primary particles, the average thickness of primary particles, the degree of monodispersity of the width, the degree of monodispersity of the thickness, the BET specific surface area, the boehmite content, and the surface treatment are as follows.
(Types of Metals)
In the plate-shaped hydrotalcites represented by the formulae (1) and (2), $M^{2+}$ indicates at least one divalent metal, and $M^{3+}$ indicates at least one trivalent metal. A preferred divalent metal is at least one divalent metal selected from the group consisting of Mg and Zn, and a preferred trivalent metal is Al. The reason for this is that these metals are very safe to living organisms and also have a wide variety of uses because particles thereof are white.
(Range of x) In the plate-shaped hydrotalcites represented by the formulae (1) and (2), the range of x is $0.1 \leq x \leq 0.33$, and preferably $0.15 \leq x \leq 0.25$. If x is more than 0.33, boehmite is formed as a by-product. Conversely, if x is less than 0.1, magnesium hydroxide is formed as a by-product. Both of these by-products cause a decrease in transparency.
(Range of m)
In the plate-shaped hydrotalcites represented by the formulae (1) and (2), the range of m is $0 \leq m \leq 10$, and preferably $0 \leq m \leq 6$.
When the temperature of a plate-shaped hydrotalcite is gradually increased, elimination of water of crystallization occurs at a temperature close to about 180 to 230° C. Therefore, in the case where the plate-shaped hydrotalcite is to be used for a synthetic resin with a relatively high kneading (or treatment, such as cross-linking) temperature of 200° C. or more, for example, it is preferable that the range of m is $0 \leq m \leq 0.05$. In this case, problems, such as foaming and silver streaks of the resin, due to the elimination of water of crystallization can be prevented.
(Type of Interlayer Anion)
In the plate-shaped hydrotalcite represented by the formula (1), $A^{n-}$ indicates an n-valent anion, and n indicates an integer of 1 to 6, and $A^{n-}$ is preferably $CO_3^{2-}$.
In the plate-shaped hydrotalcite represented by the formula (2), $A^{n-}$ indicates a monovalent anion such as $F^-$, $Cl^-$, $Br^-$, $I^-$, $NO_3^-$, or $CH_3COO^-$, and $A^{n-}$ is more preferably $F^-$, $Cl^-$, $Br^-$, or $I^-$. The use of a halide ion weakens the binding force between the layers of the plate-shaped hydrotalcite, and thus makes it possible to manufacture primary particles having a smaller thickness.
(Definition of Primary Particle)
A primary particle is a particle that has a clear boundary and cannot be geometrically divided any further. FIG. 1 is a schematic diagram for explaining the width and the thickness of a primary particle. The width $W_1$ of the primary particle and the thickness $T_1$ of the primary particle are defined as shown in FIG. 1. That is to say, assuming that the primary particle has a hexagonal plate-shaped surface, the major diameter of the particle is the "width $W_1$ of the primary particle", and the thickness of the plate-shaped surface is the "thickness $T_1$ of the primary particle".
(Definition of Secondary Particle)
A secondary particle is a particle that is an aggregate formed of a collection of a plurality of primary particles. FIG. 2 is a schematic diagram for explaining the width and the thickness of a secondary particle. The width $W_2$ of the secondary particle and the thickness $T_2$ of the secondary particle are defined as shown in FIG. 2. That is to say, since it is assumed that a primary particle has a hexagonal plate-shaped surface, when such primary particles are stacked in the thickness direction of their plate-shaped surfaces and form a secondary particle, the total thickness of the stacked primary particles in the plate-shaped surface in the thickness direction is the "thickness $T_2$ of the secondary particle", and the length of the longest diagonal of the stacked primary particles, that is, assuming that the secondary particle is enclosed in a sphere, the diameter of the sphere is the "width $W_2$ of the secondary particle".
(Average Width of Primary Particles)
In the plate-shaped hydrotalcite represented by the formula (1), (A) the average width of primary particles as measured using an SEM method is 1 μm or greater, preferably 2 μm or greater, and more preferably 3 μm or greater. The average width of primary particles is obtained from an arithmetic mean of measured values of the width of any 100 crystals in an SEM micrograph, using the SEM method. In principle, the width of primary particles cannot be measured using a laser diffraction method. Therefore, the width of primary particles is visually observed using the SEM method. In FIG. 1, the width of a primary particle is indicated by $W_1$.

(Average Thickness of Primary Particles)

In the plate-shaped hydrotalcite represented by the formula (1), (B) the average thickness of primary particles as measured using an SEM method is 80 nm or less, preferably 60 nm or less, and more preferably 40 nm or less. The average thickness of primary particles is obtained from an arithmetic mean of measured values of the thickness of any 100 crystals in an SEM micrograph, using the SEM method. In principle, the thickness of primary particles cannot be measured using a laser diffraction method. Therefore, the thickness of primary particles is visually observed using the SEM method. In FIG. 1, the thickness of a primary particle is indicated by $T_1$.

(Degree of Monodispersity of Width)

In the plate-shaped hydrotalcite represented by the formula (1), (C) the degree of monodispersity of the width, expressed by the equation below, is 50% or greater, and preferably 80% or greater. The width of secondary particles is measured using a laser diffraction method, because it is difficult to accurately measure the width of secondary particles using an SEM method. FIG. 2 is a schematic diagram for explaining the width and the thickness of a secondary particle. In FIG. 2, the width of a secondary particle is indicated by $W_2$.

Degree of monodispersity of width (%)=(average width of primary particles as measured using SEM method/average width of secondary particles as measured using laser diffraction method)×100

(Degree of Monodispersity of Thickness)

In the plate-shaped hydrotalcite represented by the formula (1), (D) the degree of monodispersity of the thickness, expressed by the equation below, is 50% or greater, and preferably 80% or greater. In principle, the thickness of secondary particles cannot be measured using a laser diffraction method. Therefore, the thickness of secondary particles is visually observed using an SEM method. In FIG. 2, the thickness of a secondary particle is indicated by $T_2$.

Degree of monodispersity of thickness (%)=(average thickness of primary particles as measured using SEM method/average thickness of secondary particles as measured using SEM method)×100

(Aspect Ratio of Secondary Particles)

In the plate-shaped hydrotalcite represented by the formula (1), the aspect ratio of secondary particles (average width of secondary particles as measured using laser diffraction method/average thickness of secondary particles as measured using SEM method) is 10 or greater, preferably 20 or greater, and more preferably 30 or greater. If the aspect ratio of secondary particles is less than 10, a sufficient resin-reinforcing effect cannot be obtained.

(BET Specific Surface Area)

In the plate-shaped hydrotalcite represented by the formula (1), the BET specific surface area is 1 to 50 $m^2/g$, preferably 3 to 40 $m^2/g$, and more preferably 5 to 30 $m^2/g$.

(Boehmite Content)

In the plate-shaped hydrotalcite represented by the formula (1), the boehmite content is 0.1 wt % or less, preferably 0.05 wt % or less, and more preferably 0.01 wt % or less, with respect to the plate-shaped hydrotalcite. A boehmite content of greater than 0.1 wt % causes a decrease in transparency when the plate-shaped hydrotalcite is added to a film, and therefore is not preferable.

(Surface Treatment)

In the plate-shaped hydrotalcite represented by the formula (1), in order to improve the dispersibility in a resin, it is desirable that particle surfaces are surface-treated. Examples of a surface treatment agent include, but are not limited to, an anionic surfactant, phosphate esters, a silane coupling agent, a titanate coupling agent, an aluminum coupling agent, a silicone-based treatment agent, water glass, silica, a cationic surfactant, and the like. The amount of surface treatment agent is 0.01 to 20 wt %, and preferably 0.5 to 5 wt %, with respect to the weight of the plate-shaped hydrotalcite represented by the formula (1).

<Resin Composition>

A resin composition of the present invention contains the plate-shaped hydrotalcite of the present invention in an amount of 0.1 to 250 parts by weight with respect to 100 parts by weight of a resin. The amount of the plate-shaped hydrotalcite that is added is more preferably 1 to 200 parts by weight.

There is no particular limitation on the method for mixing and kneading the resin and the plate-shaped hydrotalcite of the present invention, but a method that enables uniform mixing of the two components is preferable. For example, the mixing and kneading are performed using a single- or twin-screw extruder, a roller, a Banbury mixer, or the like.

There also is no particular limitation on the molding method, and a known molding means can be employed as desired, depending on the types of resin and rubber, the type of the desired molded product, and the like. For example, injection molding, extrusion molding, blow molding, press molding, rotational molding, calender molding, sheet forming molding, transfer molding, laminate molding, vacuum forming, and the like can be employed.

The resin that is used in the present invention means a resin and/or a rubber, and examples thereof include thermoplastic resins such as polyethylene, a copolymer of ethylene and another α-olefin, a copolymer of ethylene and vinyl acetate, a copolymer of ethylene and an acrylic acid ether, a copolymer of ethylene and methyl acrylate, polypropylene, a copolymer of propylene and another α-olefin, polybutene-1, poly 4-methylpentene-1, polystyrene, a copolymer of styrene and acrylonitrile, a copolymer of ethylene and a propylene diene rubber, a copolymer of ethylene and butadiene, polyvinyl acetate, polylactic acid, polyvinyl alcohol, polyacrylate, polymethacrylate, polyurethane, polyester, polyether, polyamide, ABS, polycarbonate, polyphenylene sulfide, and the like.

Moreover, the examples of the resin include thermosetting resins such as a phenolic resin, a melamine resin, an epoxy resin, an unsaturated polyester resin, an alkyd resin, and the like. Furthermore, the examples of the resin include EPDM, SBR, NBR, butyl rubber, chloroprene rubber, isoprene rubber, chlorosulfonated polyethylene rubber, silicone rubber, fluororubber, chlorinated butyl rubber, brominated butyl rubber, epichlorohydrin rubber, chlorinated polyethylene, and the like.

In addition to the plate-shaped hydrotalcite, other additives, for example, an antioxidant, a reinforcing agent such as talc, an ultraviolet absorber, a lubricant, a flatting agent such as microparticulate silica, a pigment such as carbon black, a flame retardant such as a bromine-based flame retardant or a phosphate ester-based flame retardant, and the like can be appropriately selected and added to the resin composition of the present invention. Moreover, a flame-retarding assistant, such as zinc stannate, alkali metal stannate, or a carbon powder, and a filling agent such as calcium carbonate can be appropriately selected and added.

With respect to 100 parts by weight of the resin, preferred amounts of these additives are 0.01 to 5 parts by weight for an antioxidant, 0.1 to 50 parts by weight for a reinforcing agent, 0.01 to 5 parts by weight for an ultraviolet absorber, 0.1 to 5 parts by weight for a lubricant, 0.01 to 5 parts by weight for a flatting agent, 0.01 to 5 parts by weight for a pigment, 0.1 to 50 parts by weight for a flame retardant, 0.01 to 10 parts by weight for a flame-retarding assistant, and 1 to 50 parts by weight for a filling agent.

The present invention encompasses a molded product formed of the above-described resin composition.

<Method for Manufacturing Plate-Shaped Hydrotalcite>

(i) A plate-shaped hydrotalcite containing a monovalent anion between layers, the plate-shaped hydrotalcite being obtained through a coprecipitation reaction and represented by the formula (2), is dispersed in water to prepare a slurry.

(ii) The slurry is subjected to hydrothermal treatment at 200 to 300° C. for 10 to 24 hours. During the hydrothermal treatment, a monovalent carboxylic acid ion need not be also present, but in light of the crystal growth, it is preferred that a monovalent carboxylic acid ion is present.

(Production of Slurry)

Raw materials for the plate-shaped hydrotalcite represented by the formula (2) are a divalent metal salt, a trivalent metal salt, and an alkali. A divalent metal salt containing a monovalent anion and a trivalent metal salt containing a monovalent anion can be used as the metal salts. Examples of the divalent metal salt containing a monovalent anion include, but are not limited to, magnesium chloride, magnesium bromide, magnesium nitrate, magnesium acetate, zinc chloride, zinc bromide, zinc nitrate, zinc acetate, and the like. Preferably, magnesium chloride and/or zinc chloride is used. A combination of two or more divalent metal salts can also be used. Examples of the trivalent metal salt containing a monovalent anion include, but are not limited to, aluminum chloride, aluminum bromide, aluminum nitrate, and aluminum acetate. A combination of two or more trivalent metal salts can also be used. Preferably, aluminum chloride is used. An alkali containing a monovalent anion can be used as the alkali. Examples thereof include, but are not limited to, alkali metal hydroxides and ammonia. A preferred alkali is sodium hydroxide or ammonia. The use of an alkali containing a di- or higher valent anion causes the di- or higher valent anion to be contained between the layers of the plate-shaped hydrotalcite after the reaction, and therefore is not preferable.

A slurry containing the plate-shaped hydrotalcite of the formula (2) can be prepared by preparing a mixed aqueous solution of the divalent metal salt and the trivalent metal salt and causing the mixed aqueous solution to react with the alkali. Examples of the reaction method include, but are not limited to, a batch reaction method and a continuous reaction method. When productivity is taken into account, preferably, a continuous reaction method is favorably used. During the reaction, the concentration in terms of the plate-shaped hydrotalcite is 1 to 200 g/L, preferably 5 to 170 g/L, and more preferably 10 to 140 g/L. During the reaction, a concentration of less than 1 g/L leads to low productivity and therefore is not preferable, and a concentration of more than 200 g/L causes aggregation of primary particles and therefore is not preferable. During the reaction, the temperature is 0 to 100° C., preferably 10 to 80° C., and more preferably 20 to 60° C.

(Hydrothermal Treatment)

The above-described slurry containing the plate-shaped hydrotalcite represented by the formula (2) is placed in an autoclave. The slurry is subjected to hydrothermal treatment at 200 to 300° C. for 10 to 24 hours. During the hydrothermal treatment, a monovalent carboxylic acid ion need not be also present, but in light of the crystal growth, it is preferred that a monovalent carboxylic acid ion is present. Examples of the monovalent carboxylic acid include, but are not limited to, acetic acid, propionic acid, butyric acid, and the like. Preferably, acetic acid is used. The amount of monovalent carboxylic acid that is used is preferably 0.1 to 1 mol, and more preferably 0.15 to 0.8 mol, with respect to the total number of moles of the divalent metal and the trivalent metal. If the amount of monovalent carboxylic acid that is used is less than 0.1 mol, sufficient effects of promoting the crystal growth in a lateral axis direction and suppressing the crystal growth in the thickness cannot be achieved. On the other hand, an amount of greater than 1 mol causes strong aggregation of primary particles and a resulting decrease in the degree of monodispersity, and therefore is not preferable. Moreover, the range of the hydrothermal treatment temperature is more preferably 210 to 280° C., and even more preferably 220 to 260° C. The range of the length of the hydrothermal treatment time is more preferably 11 to 20 hours, and even more preferably 12 to 18 hours. During the hydrothermal treatment, the concentration in terms of the plate-shaped hydrotalcite is 1 to 200 g/L, more preferably 5 to 170 g/L, and even more preferably 10 to 140 g/L.

(Ion Exchange)

After the hydrothermal treatment, the slurry is dehydrated and washed with an amount of deionized water that is 20 times the solid content, and then, ion exchange with a di- or higher valent anion is performed. In this manner, conversion to the plate-shaped hydrotalcite of the present invention, which is represented by the formula (1) and in which the interlayer anion includes any type of anion including the di- or higher valent anion, can be realized. There are two methods for performing the ion exchange.

The first method is to disperse, in water and/or alcohol, the plate-shaped hydrotalcite after the washing and add an anion-containing aqueous solution thereto, followed by stirring and retaining. At this time, the equivalent of the anion is 1 to 5 eq, and more preferably 1.5 to 3 eq, with respect to the plate-shaped hydrotalcite. The stirring and retaining temperature is preferably 30 to 90° C., and more preferably 50 to 80° C. The concentration of the plate-shaped hydrotalcite slurry in terms of the plate-shaped hydrotalcite is preferably 1 to 200 g/L, and more preferably 5 to 100 g/L.

The second method is to directly add an anion-containing aqueous solution to a cake of the above-described plate-shaped hydrotalcite after the washing. At this time, the equivalent of the anion is 1 to 5 eq, and more preferably 1.5 to 3 eq, with respect to the plate-shaped hydrotalcite.

(Surface Treatment)

After the ion exchange, the plate-shaped hydrotalcite is surface-treated, and thus, in the case where the plate-shaped hydrotalcite is added, kneaded, and dispersed in a resin, the dispersibility in the resin can be improved. A wet method or a dry method is used for the surface treatment. In the wet method, the plate-shaped hydrotalcite after the ion exchange is dispersed in water and/or alcohol, and a dissolved surface treatment agent is added thereto under stirring. The plate-shaped hydrotalcite slurry and the surface treatment agent are appropriately adjusted depending on the type of surface treatment agent. In the dry method, a heated and melted surface treatment agent is sprayed onto the plate-shaped hydrotalcite under stirring. The wet method is preferred in that particles can be uniformly treated.

Examples of the surface treatment agent include, but are not limited to, an anionic surfactant, phosphate esters, a silane coupling agent, a titanate coupling agent, an aluminum coupling agent, a silicone-based treatment agent, water glass, silica, a cationic surfactant, and the like. The amount of surface treatment agent that is added is preferably 0.01 to 20 wt %, and more preferably 0.5 to 5 wt %, with respect to the weight of the plate-shaped hydrotalcite represented by the formula (1).

(Granulation•Grinding•Classification•Drying)

After the ion exchange or after the surface treatment, granulation, grinding, classification, drying, and the like are performed as appropriate. Granulation is effective in improving the workability when kneading the resin.

During drying, it is preferable that the temperature is 100 to 350° C., and the retaining time is 1 to 24 hours. A drying temperature of less than 100° C. does not allow sufficient drying, and therefore is not preferable. A drying temperature of more than 350° C. causes the shape of the plate-shaped hydrotalcite to collapse, which results in a decrease in the aspect ratio of secondary particles, and therefore is not preferable. A drying time of less than one hour does not allow sufficient drying, and a drying time of more than 24 hours does not cause any change and is economically disadvantageous.

(Removal of Water of Crystallization)

In the case where water of crystallization is to be removed from the plate-shaped hydrotalcite represented by the formula (1), it is preferable that, during drying, the temperature is about 120 to 350° C., and the retaining time is 1 to 24 hours. With this treatment, the range of m of the plate-shaped hydrotalcite can be set to be $0 \leq m \leq 0.05$. A plate-shaped hydrotalcite of a type in which water of crystallization has been removed has substantially similar physical properties, such as the average width of primary particles, the average thickness of primary particles, the degree of monodispersity of the width, the degree of monodispersity of the thickness, and the BET specific surface area, to those prior to the removal of water of crystallization, and the performance of the plate-shaped hydrotalcite remains unchanged when the plate-shaped hydrotalcite is kneaded in a resin.

The drying temperature is more preferably 130 to 340° C., and even more preferably 140 to 330° C. Also, the drying time is more preferably 1.5 to 22 hours, and even more preferably 2 to 20 hours.

Hereinafter, the present invention will be described in detail using examples. However, the present invention is not limited only to these examples. In the examples below, various properties were measured using the following methods (a) to (k).

(a) Average Width and Average Thickness of Primary Particles

A specimen was added to alcohol, and ultrasonic treatment was performed for 5 minutes. After that, the width and the thickness of primary particles in any 100 crystals were measured using a scanning electron microscope (SEM) (JSM-7600F manufactured by JEOL Ltd.), and the arithmetic means of the measured values were used as the average width and the average thickness of primary particles.

(b) Average Width of Secondary Particles

A specimen was added to alcohol, and ultrasonic treatment was performed for 5 minutes. After that, the particle size distribution was measured using a particle size measuring apparatus based on a laser diffraction method (Microtrac manufactured by Nikkiso Co., Ltd.), and the average diameter for the number of measured values was used as the average width of secondary particles.

(c) Average Thickness of Secondary Particles

A specimen was added to alcohol, and ultrasonic treatment was performed for 5 minutes. After that, the thickness of secondary particles in any 100 crystals was measured using a scanning electron microscope (SEM), and the arithmetic mean of the measured values was used as the average thickness of secondary particles.

(d) Degree of Monodispersity of Width

The degree of monodispersity of the width was calculated from the values of (a) and (b) above based on the following equation.

$$\text{Degree of monodispersity of width (\%)} = (\text{average width of primary particles/average width of secondary particles}) \times 100$$

(E) Degree of Monodispersity of Thickness

The degree of monodispersity of the thickness was calculated from the values of (a) and (c) above based on the following equation.

$$\text{Degree of monodispersity of thickness (\%)} = (\text{average thickness of primary particles/average thickness of secondary particles}) \times 100$$

(f) Aspect Ratio of Secondary Particles

The aspect ratio of secondary particles was calculated from the values of (b) and (c) above based on the following equation.

$$\text{Aspect ratio of secondary particles} = (\text{average width of secondary particles/average thickness of secondary particles})$$

(g) BET Specific Surface Area

The specific surface area was measured based on a gas adsorption method, using a specific surface area measuring apparatus (NOVA 2000 manufactured by Yuasa Ionics Co., Ltd.).

(h) Presence or Absence of Boehmite

The presence or absence of boehmite was judged from the presence of an X-ray diffraction pattern using an X-ray diffractometer (Empyrean manufactured by PANalytical).

(i) Quantitative Determination of Chemical Composition

A sample was heated and dissolved in nitric acid. After that, the amounts of Mg, Zn, and Al were determined through chelatometric titration, the amount of Cl was determined through Volhard titration, the amount of Br was determined through oxidation-reduction titration, and the amount of N was determined using the Kjeldahl method. The amount of $CO_3$ was determined based on JIS. R. 9101, using an AGK type $CO_2$ simple precision quantitative analysis apparatus. The amount of interlayer water was calculated from a reduction in weight using TG-DTA.

(j) Quantitative Determination of Surface Treatment Amount

The stearic acid treatment amount of the sample was determined using an ether extraction method.

(k) Method for Measuring Flexural Modulus of Elasticity of Resin Composition

First, 100 parts by weight of polypropylene, 6 parts by weight of a test powder sample, and 12 parts by weight of talc were mixed, and the mixture was melt-kneaded at about 180° C. using a twin-screw extruder to prepare pellets. A test piece having a length of 15 cm, a width of 5 cm, and a thickness of 3 mm was prepared at about 200° C. using the obtained pellets and an injection molding machine. The flexural modulus of elasticity of the resin composition was measured based on JIS. K. 7171 using the thus prepared test piece.

Example 1

(Production of Slurry Containing Plate-Shaped Hydrotalcite Represented by Formula (2))

As raw materials, first grade reagent magnesium chloride and first grade reagent aluminum chloride were dissolved in deionized water to prepare a mixed aqueous solution with Mg=0.8 mol/L and Al=0.2 mol/L. On the other hand, first grade reagent sodium hydroxide was dissolved in deionized water to prepare an alkali solution with Na=2 mol/L. The prepared solutions were continuously supplied into a reaction vessel at 20 mL/min using a metering pump to carry out a coprecipitation reaction. The reaction vessel was made of stainless steel and had a capacity of 500 mL and an overflow structure, and 300 mL of deionized water was placed in this reaction vessel in advance, the temperature of the deionized water was adjusted to 30° C., and the deionized water was stirred using a stirrer. The raw materials, whose temperature was adjusted to 30° C. as well, were supplied into the reaction vessel, with the respective flow rates being adjusted to 20 mL/L.

The obtained reaction product was filtered and washed with deionized water, and then the cake was dispersed in deionized water to obtain a slurry containing a plate-shaped hydrotalcite represented by the formula (2).

(Hydrothermal Treatment)

The slurry containing the plate-shaped hydrotalcite represented by the formula (2) was placed in an autoclave and stirred and retained at 250° C. for 15 hours to thereby perform hydrothermal treatment. After the hydrothermal treatment, the slurry was taken out, filtered, washed with an amount of deionized water that was 20 times the solid content, and then dispersed in deionized water to prepare a slurry.

(Surface Treatment)

Sodium stearate serving as the surface treatment agent was used in an amount of 2 wt % with respect to the plate-shaped hydrotalcite, and dissolved in 50 mL of deionized water heated to 80° C., to prepare a stearic acid-containing treatment liquid. The stearic acid-containing treatment liquid was added to the washed slurry after the hydrothermal treatment whose temperature was increased to 80° C. as well, followed by stirring and retaining at 80° C. for 20 minutes. After the surface treatment, the slurry was cooled to 30° C., and then filtered and washed with deionized water. After that, the cake was placed in a hot air dryer, dried at 110° C. for 12 hours, and then ground. Thus, a plate-shaped hydrotalcite sample 1 of the present invention was obtained. Table 1 shows experimental conditions with respect to the sample 1, and Table 2 shows the chemical composition, the average width and the average thickness of primary particles, the average width and the average thickness of secondary particles, the degree of monodispersity of the width, the degree of monodispersity of the thickness, the aspect ratio of secondary particles, the BET specific surface area, the boehmite content, and the surface treatment amount. FIG. 3 shows an SEM micrograph at a magnification of 10,000 of the sample 1, and FIG. 4 shows an SEM micrograph at a magnification of 120,000.

Example 2

A plate-shaped hydrotalcite was prepared in a manner similar to that of Example 1, except that 0.25 eq of acetic acid with respect to the total number of moles of Mg and Al was added to the slurry prior to the hydrothermal treatment. Thus, a plate-shaped hydrotalcite sample 2 of the present invention was obtained. As is the case with the sample 1, Table 1 shows experimental conditions, and Table 2 shows the chemical composition, the average width and the average thickness of primary particles, the average width and the average thickness of secondary particles, the degree of monodispersity of the width, the degree of monodispersity of the thickness, the aspect ratio of secondary particles, the BET specific surface area, the boehmite content, and the surface treatment amount.

Example 3

As raw materials, first grade reagent magnesium bromide and first grade reagent aluminum bromide were dissolved in water to prepare a mixed aqueous solution with Mg=0.8 mol/L and Al=0.2 mol/L. The prepared solutions containing monovalent anions were continuously supplied into a reaction vessel at 20 mL/min using a metering pump to carry out a coprecipitation reaction. The reaction vessel was made of stainless steel and had a capacity of 500 mL and an overflow structure, and 300 mL of deionized water was placed in this reaction vessel in advance, the temperature of the deionized water was adjusted to 30° C., and the deionized water was stirred using a stirrer. The raw materials, whose temperature was adjusted to 30° C. as well, were supplied into the reaction vessel, with the respective flow rates being adjusted to 20 mL/L.

The obtained reaction product was filtered and washed with deionized water, and then the cake was dispersed in deionized water to obtain a slurry containing a plate-shaped hydrotalcite represented by the formula (2). The hydrothermal treatment and subsequent steps were performed in a manner similar to that of Example 1 to prepare a plate-shaped hydrotalcite. Thus, a plate-shaped hydrotalcite sample 3 of the present invention was obtained. As is the case with the samples 1 and 2, Table 1 shows experimental conditions, and Table 2 shows the chemical composition, the average width and the average thickness of primary particles, the average width and the average thickness of secondary particles, the degree of monodispersity of the width, the degree of monodispersity of the thickness, the aspect ratio of secondary particles, the BET specific surface area, the boehmite content, and the surface treatment amount (the same applies to samples 4 to 7 of examples and samples 8 to 14 of comparative examples below).

Example 4

As raw materials, first grade reagent magnesium nitrate and first grade reagent aluminum nitrate were dissolved in water to prepare a mixed aqueous solution with Mg=0.8 mol/L and Al=0.2 mol/L. The prepared solutions containing monovalent anions were continuously supplied into a reaction vessel at 20 mL/min using a metering pump to carry out a coprecipitation reaction. The reaction vessel was made of stainless steel and had a capacity of 500 mL and an overflow structure, and 300 mL of deionized water was placed in this reaction vessel in advance, the temperature of the deionized water was adjusted to 30° C., and the deionized water was stirred using a stirrer. The raw materials, whose temperature was adjusted to 30° C. as well, were supplied into the reaction vessel, with the respective flow rates being adjusted to 20 mL/L.

The obtained reaction product was filtered and washed with deionized water, and then the cake was dispersed in deionized water to obtain a slurry containing a plate-shaped hydrotalcite represented by the formula (2). The hydrothermal treatment and subsequent steps were performed in a manner similar to that of Example 1 to prepare a plate-shaped hydrotalcite. Thus, a plate-shaped hydrotalcite sample 4 of the present invention was obtained.

Example 5

First grade reagent magnesium chloride, first grade reagent zinc chloride, and first grade reagent aluminum chloride were dissolved in deionized water to prepare a mixed aqueous solution with Mg=0.6 mol/L, Zn=0.2 mol/L, and Al=0.2 mol/L. On the other hand, first grade reagent sodium hydroxide was dissolved in deionized water to prepare an alkali solution with Na=2 mol/L. The prepared solutions were continuously supplied into a reaction vessel at 20 mL/min using a metering pump to carry out a coprecipitation reaction. The reaction vessel was made of stainless steel and had a capacity of 500 mL and an overflow structure, and 300 mL of deionized water was placed in this reaction vessel in advance, the temperature of the deionized water was adjusted to 30° C., and the deionized water was stirred using a stirrer. The raw materials, whose temperature was adjusted to 30° C. as well, were supplied into the reaction vessel, with the respective flow rates being adjusted to 20 mL/L.

The obtained reaction product was filtered and washed with deionized water, and then the cake was dispersed in deionized water to obtain a slurry containing a plate-shaped hydrotalcite represented by the formula (2). The hydrothermal treatment and subsequent steps were performed in a manner similar to that of Example 1 to prepare a plate-shaped hydrotalcite. Thus, a plate-shaped hydrotalcite sample 5 of the present invention was obtained.

Example 6

In Example 1, after washing the slurry after the hydrothermal treatment, 1.6 eq of an aqueous solution of sodium carbonate with respect to the plate-shaped hydrotalcite was directly added to the cake of the plate-shaped hydrotalcite, and ion exchange was performed. After the aqueous solution of sodium carbonate was added, washing with deionized water was performed, and the washed cake was re-dispersed in deionized water. The surface treatment and subsequent steps were performed in a manner similar to that of Example 1 to prepare a plate-shaped hydrotalcite. Thus, a plate-shaped hydrotalcite sample 6 of the present invention was obtained.

Example 7

In Example 1, the slurry after the surface treatment was cooled to 30° C., and then filtered and washed with deionized water. After that, the cake was placed in a hot air dryer, dried at 200° C. for 12 hours, and then ground. Thus, a plate-shaped hydrotalcite sample 7 of the present invention was obtained.

Comparative Example 1

A plate-shaped hydrotalcite was prepared in a manner similar to that of Example 1, except that the Mg raw material was replaced with first grade reagent magnesium sulfate, and the Al raw material was replaced with first grade reagent aluminum sulfate. Thus, a sample 8 was obtained.

Comparative Example 2

A plate-shaped hydrotalcite was prepared in a manner similar to that of Example 1, except that the concentrations of the mixed solution of Mg and Al were changed to Mg=0.66 mol/L and Al=0.34 mol/L. Thus, a sample 9 was obtained.

Comparative Example 3

A plate-shaped hydrotalcite was prepared in a manner similar to that of Example 1, except that the retaining temperature during the hydrothermal treatment was changed to 170° C. Thus, a sample 10 was obtained.

Comparative Example 4

A plate-shaped hydrotalcite was prepared in a manner similar to that of Example 1, except that the retaining time during the hydrothermal treatment was changed to 5 hours. Thus, a sample 11 was obtained.

Comparative Example 5

A plate-shaped hydrotalcite was prepared in a manner similar to that of Example 1, except that 0.25 eq of acetic acid with respect to the total number of moles of Mg and Al was added to the slurry prior to the hydrothermal treatment, and the hydrothermal treatment time was changed to 5 hours. Thus, a sample 12 was obtained.

Comparative Example 6

A plate-shaped hydrotalcite was prepared in a manner similar to that of Example 1, except that 0.25 eq of acetic acid with respect to the total number of moles of Mg and Al was added to the slurry prior to the hydrothermal treatment, and the retaining temperature and the retaining time during the hydrothermal treatment were changed to 170° C. and 5 hours. Thus, a sample 13 was obtained.

Comparative Example 7

A plate-shaped hydrotalcite was prepared in a manner similar to that of Example 1, except that, as raw materials, first grade reagent sodium hydroxide and first grade reagent sodium carbonate were dissolved in deionized water to prepare an alkali solution with NaOH=1.8 mol/L and $Na_2CO_3$=0.2 mol/L. Thus, a sample 14 was obtained.

TABLE 1

| | | Ex. 1 | Ex. 2 | Ex. 3 | Ex. 4 |
|---|---|---|---|---|---|
| Divalent metal raw material | Substance name | Magnesium chloride | ← | Magnesium bromide | Magnesium nitrate |
| | Concentration (mol/L) | 0.8 | ← | ← | ← |
| Trivalent metal raw material | Substance name | Aluminum chloride | ← | Aluminum bromide | Aluminum nitrate |
| | Concentration (mol/L) | 0.2 | ← | ← | ← |

TABLE 1-continued

|  |  | | | | |
|---|---|---|---|---|---|
| Alkali raw material | Substance name | Sodium hydroxide | ← | ← | ← |
|  | Concentration (mol/L) | 2 | ← | ← | ← |
| Hydrothermal treatment | Retaining temperature (° C.) | 250 | ← | ← | ← |
|  | Retaining time (hr) | 15 | ← | ← | ← |
|  | Addition of monovalent carboxylic acid | Not added | Added (Acetic acid) | Not added | ← |
| Washing with sodium carbonate |  | Not washed | ← | ← | ← |
| Surface treatment | Type | Stearic acid | ← | ← | ← |
|  | Amount added (wt %, with respect to hydrotalcite) | 2 | ← | ← | ← |
| Drying treatment | Retaining temperature (° C.) | 110 | ← | ← | ← |
|  | Retaining time (hr) | 12 | ← | ← | ← |

|  |  | Ex. 5 | | Ex. 6 | Ex. 7 |
|---|---|---|---|---|---|
| Divalent metal raw material | Substance name | Magnesium chloride | Zinc chloride | Magnesium chloride | ← |
|  | Concentration (mol/L) | 0.6 | 0.2 | 0.8 | ← |
| Trivalent metal raw material | Substance name | Aluminum chloride | | ← | ← |
|  | Concentration (mol/L) | 0.2 | | ← | ← |
| Alkali raw material | Substance name | Sodium hydroxide | | ← | ← |
|  | Concentration (mol/L) | 2 | | ← | ← |
| Hydrothermal treatment | Retaining temperature (° C.) | 250 | | ← | ← |
|  | Retaining time (hr) | 15 | | ← | ← |
|  | Addition of monovalent carboxylic acid | Not added | | ← | ← |
| Washing with sodium carbonate |  | Not washed | | Washed | Not washed |
| Surface treatment | Type | Stearic acid | | ← | ← |
|  | Amount added (wt %, with respect to hydrotalcite) | 2 | | ← | ← |
| Drying treatment | Retaining temperature (° C.) | 110 | | ← | 200 |
|  | Retaining time (hr) | 12 | | ← | ← |

|  |  | Com. Ex. 1 | Com. Ex. 2 | Com. Ex. 3 |
|---|---|---|---|---|
| Divalent metal raw material | Substance name | Magnesium sulfate | Magnesium chloride | ← |
|  | Concentration (mol/L) | 0.8 | 0.66 | 0.8 |
| Trivalent metal raw material | Substance name | Aluminum sulfate | Aluminum chloride | ← |
|  | Concentration (mol/L) | 0.2 | 0.34 | 0.2 |
| Alkali raw material | Substance name | Sodium hydroxide | ← | ← |
|  | Concentration (mol/L) | 2 | ← | ← |
| Hydrothermal treatment | Retaining temperature (° C.) | 250 | ← | 170 |
|  | Retaining time (hr) | 15 | ← | ← |
|  | Addition of monovalent carboxylic acid | Not added | ← | ← |
| Washing with sodium carbonate |  | Not washed | ← | ← |
| Surface treatment | Type | Stearic acid | ← | ← |
|  | Amount added (wt %, with respect to hydrotalcite) | 2 | ← | ← |
| Drying treatment | Retaining temperature (° C.) | 110 | ← | ← |
|  | Retaining time (hr) | 12 | ← | ← |

|  |  | Com. Ex. 4 | Com. Ex. 5 | Com. Ex. 6 | Com. Ex. 7 |
|---|---|---|---|---|---|
| Divalent metal raw material | Substance name | Magnesium chloride | ← | ← | ← |
|  | Concentration (mol/L) | 0.8 | ← | ← | ← |
| Trivalent metal raw material | Substance name | Aluminum chloride | ← | ← | ← |
|  | Concentration (mol/L) | 0.2 | ← | ← | ← |
| Alkali raw material | Substance name | Sodium hydroxide | ← | ← | Sodium hydroxide | Sodium carbonate |
|  | Concentration (mol/L) | 2 | ← | ← | 1.8 | 0.2 |

TABLE 1-continued

| | | | | | |
|---|---|---|---|---|---|
| Hydrothermal treatment | Retaining temperature (° C.) | 250 | ← | 170 | 250 |
| | Retaining time (hr) | 5 | ← | ← | 15 |
| | Addition of monovalent carboxylic acid | Not added | Added (Acetic acid) | ← | Not added |
| | Washing with sodium carbonate | Not washed | ← | ← | ← |
| Surface treatment | Type | Stearic acid | ← | ← | ← |
| | Amount added (wt %, with respect to hydrotalcite) | 2 | ← | ← | ← |
| Drying treatment | Retaining temperature (° C.) | 110 | ← | ← | ← |
| | Retaining time (hr) | 12 | ← | ← | ← |

TABLE 2

| | | Ex. 1 | Ex. 2 | Ex. 3 | Ex. 4 |
|---|---|---|---|---|---|
| | | Sample No. | | | |
| | | 1 | 2 | 3 | 4 |
| Chemical composition | Before hydrothermal treatment | $Mg_{0.78}Al_{0.22}(OH)_2Cl_{0.22} \cdot 7.8H_2O$ | ← | $Mg_{0.78}Al_{0.22}(OH)_2Br_{0.22} \cdot 7.8H_2O$ | $Mg_{0.78}Al_{0.22}(OH)_2(NO_3)_{0.22} \cdot 7.8H_2O$ |
| | After hydrothermal treatment | $Mg_{0.78}Al_{0.22}(OH)_2Cl_{0.22} \cdot 7.8H_2O$ | ← | $Mg_{0.78}Al_{0.22}(OH)_2Br_{0.22} \cdot 7.8H_2O$ | $Mg_{0.78}Al_{0.22}(OH)_2(NO_3)_{0.22} \cdot 7.8H_2O$ |
| | After drying | $Mg_{0.78}Al_{0.22}(OH)_2Cl_{0.22} \cdot 7.8H_2O$ | ← | $Mg_{0.78}Al_{0.22}(OH)_2Br_{0.22} \cdot 7.8H_2O$ | $Mg_{0.78}Al_{0.22}(OH)_2(NO_3)_{0.22} \cdot 7.8H_2O$ |
| Primary particles | Average width (μm) | 2.8 | 3.3 | 2.6 | 1.4 |
| | Average thickness (nm) | 57 | 53 | 42 | 45 |
| Secondary particles | Average width (μm) | 3.2 | 3.9 | 3.1 | 1.8 |
| | Average thickness (nm) | 65 | 63 | 59 | 56 |
| | Aspect ratio | 49 | 62 | 53 | 32 |
| Degree of monodispersity | Width (%) | 88 | 85 | 84 | 78 |
| | Thickness (%) | 88 | 84 | 71 | 80 |
| BET specific surface area (m²/g) | | 13 | 15 | 14 | 23 |
| Stearic acid | Treatment amount (wt %, with respect to hydrotalcite) | 1.9 | 1.8 | 1.7 | 1.8 |
| Boehmite | Content (wt %, with respect to hydrotalcite) | 0.002 | 0.005 | 0.008 | 0.006 |

| | | Ex. 5 | Ex. 6 | Ex. 7 |
|---|---|---|---|---|
| | | Sample No. | | |
| | | 5 | 6 | 7 |
| Chemical composition | Before hydrothermal treatment | $Mg_{0.59}Zn_{0.19}Al_{0.22}(OH)_2Cl_{0.22} \cdot 7.9H_2O$ | $Mg_{0.78}Al_{0.22}(OH)_2Cl_{0.22} \cdot 7.8H_2O$ | $Mg_{0.78}Al_{0.22}(OH)_2Cl_{0.22} \cdot 7.8H_2O$ |
| | After hydrothermal treatment | $Mg_{0.59}Zn_{0.19}Al_{0.22}(OH)_2Cl_{0.22} \cdot 7.9H_2O$ | $Mg_{0.78}Al_{0.22}(OH)_2Cl_{0.22} \cdot 7.8H_2O$ | $Mg_{0.78}Al_{0.22}(OH)_2Cl_{0.22} \cdot 7.8H_2O$ |
| | After ion exchange | — | $Mg_{0.78}Al_{0.22}(OH)_2(CO_3)_{0.11} \cdot 7.8H_2O$ | — |
| | After drying | $Mg_{0.59}Zn_{0.19}Al_{0.22}(OH)_2Cl_{0.22} \cdot 7.9H_2O$ | $Mg_{0.78}Al_{0.22}(OH)_2(CO_3)_{0.11} \cdot 7.8H_2O$ | $Mg_{0.78}Al_{0.22}(OH)_2Cl_{0.22}$ |
| Primary particles | Average width (μm) | 2.6 | 2.7 | 2.8 |
| | Average thickness (nm) | 53 | 55 | 52 |
| Secondary particles | Average width (μm) | 3.2 | 3.3 | 3.2 |
| | Average thickness (nm) | 63 | 67 | 58 |
| | Aspect ratio | 51 | 49 | 55 |
| Degree of monodispersity | Width (%) | 81 | 82 | 88 |
| | Thickness (%) | 84 | 82 | 90 |
| BET specific surface area (m²/g) | | 16 | 11 | 20 |
| Stearic acid | Treatment amount (wt %, with respect to hydrotalcite) | 1.8 | 1.9 | 1.9 |

TABLE 2-continued

| | | | | |
|---|---|---|---|---|
| Boehmite | Content (wt %, with respect to hydrotalcite) | 0.005 | 0.002 | 0.002 |

| | | Com. Ex. 1 | Com. Ex. 2 | Com. Ex. 3 |
|---|---|---|---|---|
| | | Sample No. | | |
| | | 8 | 9 | 10 |
| Chemical composition | Before hydrothermal treatment | $Mg_{0.78}Al_{0.22}(OH)_2(SO_4)_{0.11} \cdot 7.8H_2O$ | $Mg_{0.66}Al_{0.34}(OH)_2Cl_{0.34} \cdot 7.9H_2O$ | $Mg_{0.78}Al_{0.22}(OH)_2Cl_{0.22} \cdot 7.8H_2O$ |
| | After hydrothermal treatment | $Mg_{0.78}Al_{0.22}(OH)_2(SO_4)_{0.11} \cdot 7.8H_2O$ | $Mg_{0.64}Al_{0.36}(OH)_2Cl_{0.36} \cdot 7.9H_2O$ | $Mg_{0.78}Al_{0.22}(OH)_2Cl_{0.22} \cdot 7.8H_2O$ |
| Primary particles | Average width (μm) | 1.1 | 2.3 | 0.3 |
| | Average thickness (nm) | 62 | 90 | 38 |
| Secondary particles | Average width (μm) | 3.3 | 2.6 | 1.8 |
| | Average thickness (nm) | 180 | 100 | 143 |
| | Aspect ratio | 18 | 26 | 13 |
| Degree of monodispersity | Width (%) | 33 | 88 | 17 |
| | Thickness (%) | 34 | 90 | 27 |
| BET specific surface area (m²/g) | | 25 | 8 | 25 |
| Stearic | Treatment amount (wt %, | 1.8 | 1.8 | 1.7 |
| Boehmite | Content (wt %, with respect to hydrotalcite) | 0.002 | 1.552 | 0.013 |

| | | Com. Ex. 4 | Com. Ex. 5 | Com. Ex. 6 | Com. Ex. 7 |
|---|---|---|---|---|---|
| | | Sample No. | | | |
| | | 11 | 12 | 13 | 14 |
| Chemical composition | Before hydrothermal treatment | $Mg_{0.78}Al_{0.22}(OH)_2Cl_{0.22} \cdot 7.8H_2O$ | ← | ← | $Mg_{0.78}Al_{0.22}(OH)_2(CO_3)_{0.11} \cdot 7.8H_2O$ |
| | After hydrothermal treatment | $Mg_{0.78}Al_{0.22}(OH)_2Cl_{0.22} \cdot 7.8H_2O$ | ← | ← | $Mg_{0.78}Al_{0.22}(OH)_2(CO_3)_{0.11} \cdot 7.8H_2O$ |
| Primary particles | Average width (μm) | 0.9 | 0.9 | 0.7 | 1.8 |
| | Average thickness (nm) | 55 | 36 | 60 | 113 |
| Secondary particles | Average width (μm) | 1.9 | 1.5 | 1.9 | 2.3 |
| | Average thickness (nm) | 87 | 70 | 149 | 163 |
| | Aspect ratio | 22 | 21 | 13 | 14 |
| Degree of monodispersity | Width (%) | 47 | 60 | 37 | 78 |
| | Thickness (%) | 63 | 51 | 40 | 69 |
| BET specific surface area (m²/g) | | 23 | 26 | 31 | 14 |
| Stearic acid | Treatment amount (wt %, with respect to hydrotalcite) | 1.6 | 1.7 | 1.7 | 1.8 |
| Boehmite | Content (wt %, with respect to hydrotalcite) | 0.032 | 0.012 | 0.014 | 0.018 |

It can be seen from Tables 1 and 2 that in the plate-shaped hydrotalcites of Examples 1 to 7, primary particles had an average width of 1 μm or greater and an average thickness of 60 nm or less. Moreover, the degrees of monodispersity of the width and the thickness were both 50 or greater, which indicate high dispersibility. Furthermore, even though the hydrothermal treatment temperature was as high as 250° C., the boehmite content was 0.01 wt % or less with respect to the plate-shaped hydrotalcite.

It can be seen from Table 2 that in Comparative Example 1, particles in which primary particles had an average width of 1.1 μm and an average thickness of 62 nm were obtained. However, due to the effect of the sulfuric acid ion, which is a divalent anion, primary particles strongly aggregated, resulting in a low degree of monodispersity and a low aspect ratio of secondary particles.

It can be seen from Table 2 that in Comparative Example 2, the ratio of the divalent metal to the trivalent metal was low, and the boehmite content was as high as 1.552 wt % with respect to the plate-shaped hydrotalcite.

It can be seen from Table 2 that in Comparative Examples 3 to 6, the retaining temperature and the retaining time during the hydrothermal treatment were changed, but the average width of primary particles was small in all of those comparative examples.

It can be seen from Table 2 that in Comparative Example 7, a mixed liquid of sodium hydroxide and sodium carbonate was used as the alkali raw material during the reaction. Due to the effect of sodium carbonate, the interlayer anion of the plate-shaped hydrotalcite before the hydrothermal treatment was the divalent carbonic acid ion, and the thickness of primary particles after the hydrothermal treatment was as large as 113 nm.

Example 8

First, 12 parts by weight of the powder sample 1 prepared in Example 1, 100 parts by weight of polypropylene, and 0.2 parts by weight of an antioxidant were mixed, and melt-kneaded at about 180° C. using a twin-screw extruder to prepare pellets. A test piece having a length of 15 cm, a width of 5 cm, and a thickness of 3 mm was prepared at about 200° C. using the obtained pellets and an injection molding machine, and used as a resin sample 1. Table 3 shows the flexural modulus of elasticity of the resin sample 1.

Example 9

A resin composition was prepared according to a method similar to that of Example 8 using the powder sample 2 prepared in Example 2, and used as a resin sample 2. Table 3 shows the flexural modulus of elasticity of the resin sample 2.

Example 10

A resin composition was prepared according to a method similar to that of Example 8 using the powder sample 3 prepared in Example 3, and used as a resin sample 3. Table 3 shows the flexural modulus of elasticity of the resin sample 3.

Example 11

A resin composition was prepared according to a method similar to that of Example 8 using the powder sample 4 prepared in Example 4, and used as a resin sample 4. Table 3 shows the flexural modulus of elasticity of the resin sample 4.

Example 12

A resin composition was prepared according to a method similar to that of Example 8 using the powder sample 5 prepared in Example 5, and used as a resin sample 5. Table 3 shows the flexural modulus of elasticity of the resin sample 5.

Example 13

A resin composition was prepared according to a method similar to that of Example 8 using the powder sample 6 prepared in Example 6, and used as a resin sample 6. Table 3 shows the flexural modulus of elasticity of the resin sample 6.

Example 14

A resin composition was prepared according to a method similar to that of Example 8 using the powder sample 7 prepared in Example 7, and used as a resin sample 7. Table 3 shows the flexural modulus of elasticity of the resin sample 6.

Comparative Example 8

A resin composition was prepared according to a method similar to that of Example 8 using the powder sample 8 prepared in Comparative Example 1, and used as a resin sample 8. Table 3 shows the flexural modulus of elasticity of the resin sample 8.

Comparative Example 9

A resin composition was prepared according to a method similar to that of Example 8 using the powder sample 9 prepared in Comparative Example 2, and used as a resin sample 9. Table 3 shows the flexural modulus of elasticity of the resin sample 9.

Comparative Example 10

A resin composition was prepared according to a method similar to that of Example 8 using the powder sample 10 prepared in Comparative Example 3, and used as a resin sample 10. Table 3 shows the flexural modulus of elasticity of the resin sample 10.

Comparative Example 11

A resin composition was prepared according to a method similar to that of Example 8 using the powder sample 11 prepared in Comparative Example 4, and used as a resin sample 11. Table 3 shows the flexural modulus of elasticity of the resin sample 11.

Comparative Example 12

A resin composition was prepared according to a method similar to that of Example 8 using the powder sample 12 prepared in Comparative Example 5, and used as a resin sample 12. Table 3 shows the flexural modulus of elasticity of the resin sample 12.

Comparative Example 13

A resin composition was prepared according to a method similar to that of Example 8 using the powder sample 13 prepared in Comparative Example 6, and used as a resin sample 13. Table 3 shows the flexural modulus of elasticity of the resin sample 13.

Comparative Example 14

A resin composition was prepared according to a method similar to that of Example 8 using the powder sample 14 prepared in Comparative Example 7, and used as a resin sample 14. Table 3 shows the flexural modulus of elasticity of the resin sample 14.

TABLE 3

|  | Ex. 8 | Ex. 9 | Ex. 10 | Ex. 11 |
|---|---|---|---|---|
| Powder sample 1 (parts by weight) | 12 | — | — | — |
| Powder sample 2 (parts by weight) | — | 12 | — | — |
| Powder sample 3 (parts by weight) | — | — | 12 | — |
| Powder sample 4 (parts by weight) | — | — | — | 12 |
| Polypropylene (parts by weight) | 100 | ← | ← | ← |
| Antioxidant (parts by weight) | 0.2 | ← | ← | ← |
| Flexural modulus of elasticity (MPa) | 1608 | 1752 | 1621 | 1485 |
| Resin sample No. | Resin sample 1 | Resin sample 2 | Resin sample 3 | Resin sample 4 |

|  | Ex. 12 | Ex. 13 | Ex. 14 |
|---|---|---|---|
| Powder sample 5 (parts by weight) | 12 | — | — |
| Powder sample 6 (parts by weight) | — | 12 | — |
| Powder sample 7 (parts by weight) | — | — | 12 |
| Polypropylene (parts by weight) | 100 | ← | ← |
| Antioxidant (parts by weight) | 0.2 | ← | ← |
| Flexural modulus of elasticity (MPa) | 1589 | 1596 | 1678 |
| Resin sample No. | Resin sample 5 | Resin sample 6 | Resin sample 7 |

|  | Com. Ex. 8 | Com. Ex. 9 | Com. Ex. 10 |
|---|---|---|---|
| Powder sample 8 (parts by weight) | 12 | — | — |
| Powder sample 9 (parts by weight) | — | 12 | — |
| Powder sample 10 (parts by weight) | — | — | 12 |
| Polypropylene (parts by weight) | 100 | 100 | 100 |
| Antioxidant (parts by weight) | 0.2 | ← | ← |
| Flexural modulus of elasticity (MPa) | 1352 | 1402 | 1289 |
| Resin sample No. | Resin sample 8 | Resin sample 9 | Resin sample 10 |

TABLE 3-continued

|  | Com. Ex. 11 | Com. Ex. 12 | Com. Ex. 13 | Com. Ex. 14 |
|---|---|---|---|---|
| Powder sample 11 (parts by weight) | 12 | — | — | — |
| Powder sample 12 (parts by weight) | — | 12 | — | — |
| Powder sample 13 (parts by weight) | — | — | 12 | — |
| Powder sample 14 (parts by weight) | — | — | — | 12 |
| Polypropylene (parts by weight) | 100 | ← | ← | ← |
| Antioxidant (parts by weight) | 0.2 | ← | ← | ← |
| Flexural modulus of elasticity (MPa) | 1385 | 1374 | 1250 | 1302 |
| Resin sample No. | Resin sample 11 | Resin sample 12 | Resin sample 13 | Resin sample 14 |

It can be seen from Table 3 that the resin samples 1 to 7 of Examples 8 to 14 had higher flexural moduli of elasticity compared with the resin samples 8 to 14 of Comparative Examples 8 to 14. It can be seen from Tables 2 and 3 that the higher the aspect ratio of secondary particles of a plate-shaped hydrotalcite, the further the flexural modulus of elasticity of a resulting resin improves.

INDUSTRIAL APPLICABILITY

The plate-shaped hydrotalcite of the present invention can impart stiffness, flame retardancy, glossiness, and gas barrier properties when added to a resin. In addition, the plate-shaped hydrotalcite can impart a rustproofing effect when added to a paint, and can also be used as a base of a pearl pigment.

REFERENCE SIGNS LIST $W_1$ Width of primary particle
$W_2$ Width of secondary particle
$T_1$ Thickness of primary particle
$T_2$ Thickness of secondary particle

The invention claimed is:

1. A plate-shaped hydrotalcite represented by a formula (1) below:

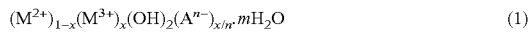
$$(M^{2+})_{1-x}(M^{3+})_x(OH)_2(A^{n-})_{x/n} \cdot mH_2O \quad (1)$$

wherein $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.1 \leq x \leq 0.33$ and $0 \leq m \leq 10$, the plate-shaped hydrotalcite satisfying (A) to (D) below:
(A) an average width of primary particles as measured using an SEM method is 1 μm or greater;
(B) an average thickness of primary particles as measured using an SEM method is 80 nm or less;
(C) a degree of monodispersity of width expressed by an equation below is 50% or greater:

degree of monodispersity of width (%)=(average width of primary particles as measured using the SEM method/average width of secondary particles as measured using a laser diffraction method)×100; and (D) a degree of monodispersity of thickness expressed by an equation below is 50% or greater:

degree of monodispersity of thickness (%)=(average thickness of primary particles as measured using the SEM method/average thickness of secondary particles as measured using an SEM method)×100; and a boehmite content in the plate-shaped hydrotalcite being 0.1 wt. % or less with respect to the plate-shaped hydrotalcite.

2. The plate-shaped hydrotalcite according to claim 1, wherein (A) the average width of primary particles is 2 μm or greater.

3. The plate-shaped hydrotalcite according to claim 1, wherein (B) the average thickness of primary particles is 60 nm or less.

4. The plate-shaped hydrotalcite according to claim 1, wherein (C) the degree of monodispersity of the width is 80% or greater.

5. The plate-shaped hydrotalcite according to claim 1, wherein (D) the degree of monodispersity of the thickness is 80% or greater.

6. The plate-shaped hydrotalcite according to claim 1, wherein, in the formula (1), $M^{2+}$ is at least one divalent metal selected from the group consisting of Mg and Zn, and $M^{3+}$ is Al.

7. The plate-shaped hydrotalcite according to claim 1, wherein, in the formula (1), the range of x is $0.15 \leq x \leq 0.25$.

8. The plate-shaped hydrotalcite according to claim 1, wherein surfaces of plate-shaped hydrotalcite particles are surface-treated with at least one agent selected from the group consisting of an anionic surfactant, phosphate esters, a silane coupling agent, a titanate coupling agent, an aluminum coupling agent, a silicone-based treatment agent, water glass, silica, and a cationic surfactant.

9. The plate-shaped hydrotalcite according to claim 1, wherein, in the formula (1), the range of m is $0 \leq m \leq 0.05$.

10. The plate-shaped hydrotalcite according to claim 1, wherein the boehmite content in the plate-shaped hydrotalcite is 0.002 to 0.1 wt. % with respect to the plate-shaped hydrotalcite.

11. The plate-shaped hydrotalcite according to claim 1, wherein the boehmite content in the plate-shaped hydrotalcite is 0.002 to 0.008 wt. % with respect to the plate-shaped hydrotalcite.

12. A plate-shaped hydrotalcite represented by a formula (1) below:

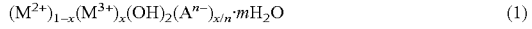
$$(M^{2+})_{1-x}(M^{3+})_x(OH)_2(A^{n-})_{x/n} \cdot mH_2O \quad (1)$$

wherein $M^{2+}$ indicates at least one divalent metal, $M^{3+}$ indicates at least one trivalent metal, $A^{n-}$ indicates an n-valent anion, n indicates an integer of 1 to 6, and x and m are within respective ranges of $0.1 \leq x \leq 0.33$ and $0 \leq m \leq 10$, the plate-shaped hydrotalcite satisfying (A) to (E) below:
(A) an average width of primary particles as measured using an SEM method is 1 μm or greater;
(B) an average thickness of primary particles as measured using an SEM method is 80 nm or less;
(C) a degree of monodispersity of width expressed by an equation below is 50% or greater:

degree of monodispersity of width (%)=(average width of primary particles as measured using the SEM method/average width of secondary particles as measured using a laser diffraction method)×100;

(D) a degree of monodispersity of thickness expressed by an equation below is 50% or greater:

degree of monodispersity of thickness (%)=(average thickness of primary particles as measured using the SEM method/average thickness of secondary particles as measured using an SEM method)×100; and (E) an aspect ratio of secondary particles (average width of secondary particles as measured using the laser diffraction method/average thickness of secondary particles as measured using the SEM method) is 10 or greater; and a boehmite content in the plate-shaped hydrotalcite being 0.1 wt. % or less with respect to the plate-shaped hydrotalcite.

13. A resin composition which contains the plate-shaped hydrotalcite of claim 1 in an amount of 0.1 to 250 parts by weight with respect to 100 parts by weight of a resin.

14. A molded product formed of the resin composition according to claim 13.

15. A method for manufacturing the plate-shaped hydrotalcite according to claim 1, the method comprising:

(i) preparing a slurry by dispersing a plate-shaped hydrotalcite represented by a formula (2) below in water; and
(ii) subjecting the slurry to hydrothermal treatment at 200 to 300° C. for 10 to 24 hours, $$(M^{2+})_{1-x}(M^{3+})_x(OH)_2(A^{n-})_{x/n} \cdot mH_2O \qquad (2)$$

where $M^{2+}$ indicates at least one divalent metal, $M^{3+}$ indicates at least one trivalent metal, $A^{n-}$ indicates a monovalent anion such as $F^-$, $Cl^-$, $Br^-$, $I^-$, $NO_3^-$, or $CH_3COO^-$, and x and m are within respective ranges of $0.1 \le x \le 0.33$ and $0 \le m \le 10$.

16. The method for manufacturing a plate-shaped hydrotalcite according to claim 15, wherein $A^{n-}$ of the plate-shaped hydrotalcite represented by the formula (2) is at least one monovalent anion selected from the group consisting of $F^-$, $Cl^-$, $Br^-$, and $I^-$.

17. The method for manufacturing the plate-shaped hydrotalcite according to claim 15, wherein the method further comprises (iii) the plate-shaped hydrotalcite is obtained by further drying the plate-shaped hydrotalcite at 120° C. to 350° C. for 1 to 24 hours.

\* \* \* \* \*